United States Patent Office 2,776,906
Patented Jan. 8, 1957

2,776,906
POINTING AND CAULKING COMPOUND

Donald Hill and Harry M. Whitney, Toronto, Ontario, Canada

No Drawing. Application November 5, 1954, Serial No. 467,214

6 Claims. (Cl. 106—257)

This invention relates to improvements in pointing or caulking compounds and particularly to a compound of this nature for pointing stone, masonry and the like.

Previous compounds of this nature have had certain disadvantages, particularly where used to point stone or like material. Firstly such compounds have inherently had a colour or appearance contrasting with the stone so that the presence of the pointing compound is undesirably emphasized. Further, it has been difficult to obtain a bond of sufficient intimacy between the compound and the stone and the hardness of the compound on drying has been quite limited.

In addition, such previous compounds providing an acceptable degree of hardness have not been capable of application by means of the conventional caulking gun device.

It is therefore the object of the present invention to provide a pointing or caulking compound which will have an increased hardness as well as an improved appearance more closely simulating stone to provide a material improvement in the appearance and structural strength of a pointed wall, chimney, or other structure.

Again it is an object to provide a compound as aforesaid which will achieve a stronger and more intimate bond with the stone or other material to which it is applied.

Still another object is to provide a compound the colour or appearance of which can be more readily modified or controlled than with previous compounds.

It is also an object to enable a compound as aforesaid to be adapted for caulking gun application.

According to the invention the pointing or caulking compound comprises a mixture of silica sand, silica flour, white lead, litharge and powdered or dry whiting, to which is added an oil preferably boiled linseed oil to render the mixture plastic.

The inclusion of the silica flour has been found to produce a harder bind between the ingredients in the ultimate compound product to approach the hardness of stone.

The inclusion of a specific proportion of white lead has been found to provide a product which on drying after application closely approximates stone colour and which will have a rate of drying such as to allow the compound to penetrate into the rock, stone or other material with which it is used to provide a superior bond than heretofore obtainable.

Where the compound is to be forced through a nozzle for gun application, it is a further feature of the invention to include a plasticiser. It has been found that asbestos shorts serve as an effective plasticiser for this application.

More specifically a compound according to the invention comprises the following ingredients combined in approximately the following proportions by weight:

75 to 90 lbs. of silica sand
15 to 25 lbs. of crushed silica flour
15 to 17 lbs. of white lead
6 to 8 lbs. of litharge
10 to 14 lbs. of powdered or dry whiting These ingredients are intimately mixed in a dry state and then when the compound is to be applied a quantity of oil, preferably boiled linseed oil, sufficient to render the mixture plastic for conventional application, is added.

For caulking gun application to the mixture may be added approximately 3 lbs. of asbestos shorts.

Because of the relatively neutral colour of the mixture, drying to a colour closely approximating stone, the compound may be readily tinted to any desired colour by a suitable dye or pigment.

It will be understood that the addition of such dyes, pigments, plasticisers and the like may be made in accordance with the desired application without departing from the scope of the invention as set forth in the appended claims.

Where reference is made to boiled linseed oil such an oil preferably comprises a double boiled linseed oil to provide a linseed oil of optimum drying characteristics.

What we claim as our invention is:

1. A compound for use in pointing comprising the following ingredients mixed together in substantially the following proportions by weight:

75 to 90 lbs. of silica sand
15 to 25 lbs. of crushed silica flour
15 to 17 lbs. of white lead
6 to 8 lbs. of litharge
10 to 14 lbs. of powdered or dry whiting 2. A compound as claimed in claim 1 to which a sufficient quantity of oil is added to render it plastic.

3. A compound as claimed in claim 2 in which said oil is boiled linseed oil.

4. A compound as claimed in claim 1 in which asbestos shorts is added.

5. A compound as claimed in claim 4 in which the quantity of asbestos shorts is approximately 3 lbs.

6. A compound for use in pointing comprising the following ingredients mixed together in substantially the following proportions by weight:

80 lbs. silica sand
20 lbs. crushed silica flour
15 lbs. white lead
7 lbs. litharge
10 lbs. powdered whiting

References Cited in the file of this patent

UNITED STATES PATENTS

| | | |
|---|---|---|
| 134,323 | Staling | Dec. 24, 1872 |
| 887,248 | Golder | May 12, 1908 |
| 1,244,326 | Hardman et al. | Oct. 23, 1917 |
| 2,081,558 | Prange | May 25, 1937 |
| 2,348,619 | Green et al. | May 9, 1944 |

FOREIGN PATENTS

| | | |
|---|---|---|
| 1,040 | Great Britain | Aug. 3, 1773 |
| 372,620 | France | Feb. 23, 1907 |